US012620138B2

(12) United States Patent
Nguyen Canh et al.

(10) Patent No.: US 12,620,138 B2
(45) Date of Patent: May 5, 2026

(54) METHOD AND APPARATUS TO QUANTIZE IN MULTIPLE SUB-MESHES

(71) Applicant: TENCENT AMERICA LLC, Palo Alto, CA (US)

(72) Inventors: Thuong Nguyen Canh, San Bruno, CA (US); Xiaozhong Xu, Palo Alto, CA (US); Fang-Yi Chao, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 191 days.

(21) Appl. No.: 18/431,521

(22) Filed: Feb. 2, 2024

(65) Prior Publication Data

US 2024/0265584 A1 Aug. 8, 2024

Related U.S. Application Data

(60) Provisional application No. 63/443,666, filed on Feb. 6, 2023.

(51) Int. Cl.
G06T 9/00 (2006.01)
G06T 7/50 (2017.01)
(Continued)

(52) U.S. Cl.
CPC ............... G06T 9/001 (2013.01); G06T 7/50 (2017.01); G06T 7/75 (2017.01); G06T 17/205 (2013.01); *G06T 2210/12* (2013.01)

(58) Field of Classification Search
CPC .. G06T 9/001; G06T 7/50; G06T 7/75; G06T 17/205; G06T 2210/12; G06T 17/20;
(Continued)

(56) References Cited

U.S. PATENT DOCUMENTS

| 11,568,602 | B2 * | 1/2023 | Nakagami | ............. | G06T 17/205 |
| 11,893,692 | B1 * | 2/2024 | Baize | ................... | G06T 17/205 |

(Continued)

FOREIGN PATENT DOCUMENTS

GB 2552510 A 1/2018

OTHER PUBLICATIONS

International Search Report dated May 17, 2024, issued in International Application No. PCT/US 24/14417.
(Continued)

*Primary Examiner* — Michael S Osinski
(74) *Attorney, Agent, or Firm* — Sughrue Mion, PLLC

(57) ABSTRACT

A method comprises receiving an input mesh comprising a plurality of sub-meshes; determining, for a respective sub-mesh in the plurality of sub-meshes, a sub-mesh bounding box that encloses the respective sub-mesh; determining, for the respective sub-mesh, a coordinate in the respective sub-mesh, wherein the coordinate is a minimum coordinate that has a smallest value in the respective sub-mesh; determining, for the respective sub-mesh, a first bitdepth based on the coordinate and the sub-mesh bounding box, wherein the first bitdepth is an adaptive bitdepth that varies according to an area of the respective sub-mesh; determining a second bitdepth that is a maximum of the first bitdepth for the respective sub-mesh and a first bit depth determined for each of the remaining sub-meshes from the plurality of sub-meshes; quantizing the respective sub-mesh based on the second bitdepth to generate a respective quantized sub-mesh; and encoding the respective quantized sub-mesh.

20 Claims, 7 Drawing Sheets

(51) Int. Cl.
    *G06T 7/73*           (2017.01)
    *G06T 17/20*        (2006.01)

(58) Field of Classification Search
    CPC ................. G06T 19/20; G06T 2210/36; G06T 2207/10028; G06T 2210/56; G06T 7/10; G06T 15/04; G06T 2207/20021; G06V 10/454; G06V 10/82
    See application file for complete search history.

(56) References Cited

U.S. PATENT DOCUMENTS

| | | | | |
|---|---|---|---|---|
| 12,033,282 | B2 * | 7/2024 | Nadro | G06T 15/005 |
| 12,256,098 | B1 * | 3/2025 | Mammou | H04N 19/597 |
| 12,293,467 | B2 * | 5/2025 | Mason | G06T 17/20 |
| 2009/0213131 | A1 * | 8/2009 | DeRose | G06T 17/20 |
| | | | | 345/581 |
| 2018/0232912 | A1 * | 8/2018 | Nevraev | G06T 15/80 |
| 2019/0147649 | A1 * | 5/2019 | Brochu | G06T 19/20 |
| | | | | 345/420 |
| 2019/0206100 | A1 * | 7/2019 | Batra | G06T 11/40 |
| 2019/0236809 | A1 * | 8/2019 | Graziosi | G06T 7/10 |
| 2020/0111237 | A1 | 4/2020 | Tourapis et al. | |
| 2021/0217202 | A1 | 7/2021 | Zakharchenko et al. | |
| 2021/0304443 | A1 * | 9/2021 | Zhang | G06T 9/40 |
| 2021/0343082 | A1 * | 11/2021 | Kim | G06T 9/001 |
| 2022/0019852 | A1 * | 1/2022 | Eyjolfsdottir | G06N 3/045 |
| 2022/0139038 | A1 * | 5/2022 | Lieutier | G06T 19/20 |
| | | | | 345/419 |
| 2022/0301348 | A1 * | 9/2022 | Bradley | G06T 17/20 |
| 2023/0149813 | A1 * | 5/2023 | Kohler | G06T 15/04 |
| | | | | 463/31 |
| 2023/0237705 | A1 * | 7/2023 | Wan | H04N 19/96 |
| | | | | 382/232 |
| 2023/0281925 | A1 * | 9/2023 | Aigerman | G06T 17/20 |
| | | | | 345/419 |
| 2023/0298271 | A1 * | 9/2023 | Chen | G06T 17/205 |
| | | | | 345/418 |
| 2024/0029392 | A1 * | 1/2024 | Fan | G06V 10/82 |
| 2024/0233194 | A1 * | 7/2024 | Chen | H04N 19/597 |
| 2025/0022181 | A1 * | 1/2025 | Tian | G06T 9/001 |
| 2025/0259335 | A1 * | 8/2025 | Rondao Alface | G06T 9/001 |

OTHER PUBLICATIONS

Written Opinion dated May 17, 2024, issued in International Application No. PCT/US 24/14417.

\* cited by examiner

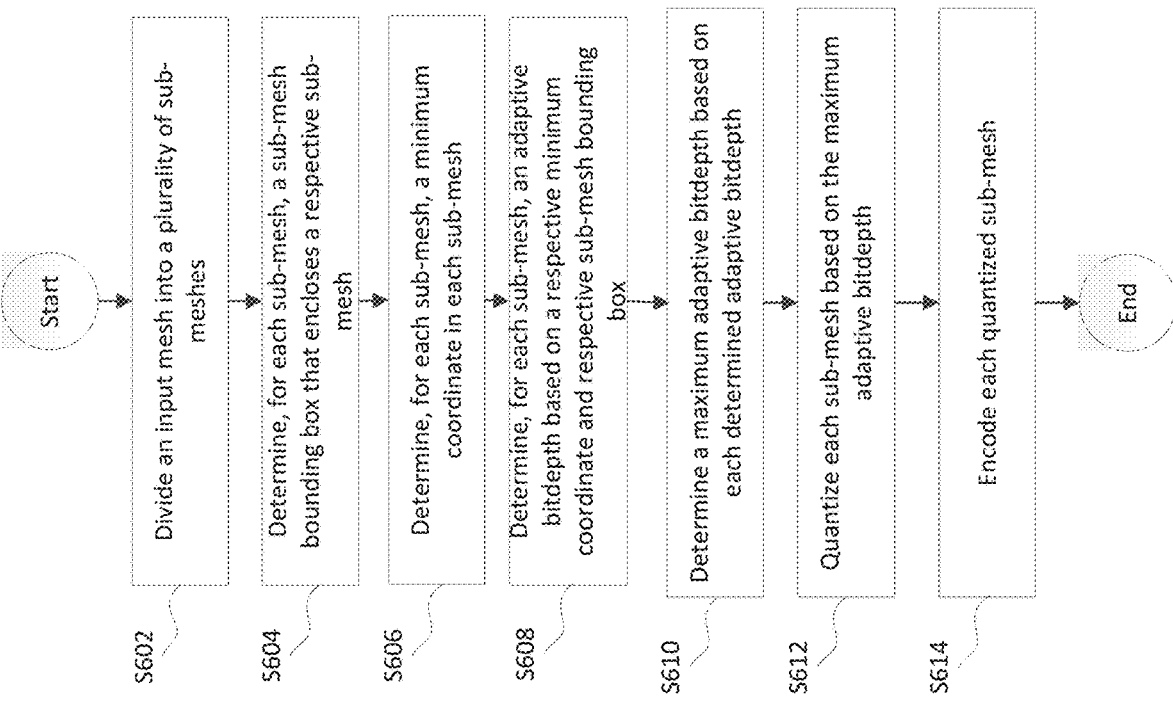

Start

S602 — Divide an input mesh into a plurality of sub-meshes

S604 — Determine, for each sub-mesh, a sub-mesh bounding box that encloses a respective sub-mesh S606 — Determine, for each sub-mesh, a minimum coordinate in each sub-mesh S608 — Determine, for each sub-mesh, an adaptive bitdepth based on a respective minimum coordinate and respective sub-mesh bounding box S610 — Determine a maximum adaptive bitdepth based on each determined adaptive bitdepth S612 — Quantize each sub-mesh based on the maximum adaptive bitdepth S614 — Encode each quantized sub-mesh End

METHOD AND APPARATUS TO QUANTIZE IN MULTIPLE SUB-MESHES

CROSS-REFERENCE TO RELATED APPLICATION

This application claims priority from U.S. Provisional Application No. 63/443,666 filed on Feb. 6, 2023, the disclosure of which is incorporated herein by reference in its entirety.

FIELD

This disclosure is directed to a set of advanced video coding technologies. More specifically, the present disclosure is directed to quantizing multiple sub-meshes.

BACKGROUND

VMesh is an ongoing MPEG standard to compress meshes. VMesh separates an input mesh into a simplified base mesh and a displacement mesh. The base mesh is encoded with a lossy encoder (e.g., Draco). The remainder mesh is encoded with subdivision surface fitting and displacement encoding to exploit local characteristics.

A complex scene may include multiple objects. However, in complex scenes, the largest object may be a background feature, which is often simple and can tolerate a higher quantization step size. In contrast, the main objects are at a smaller scale and suffer huge quantization error.

A mesh may be split to multiple non-connected sub-meshes based one or more characteristics. Each sub-mesh may be quantized with a different quantization bitdepth to improve coding efficiency. Quantization error is significant at the boundary of connected meshes due to the difference in quantization.

SUMMARY

According to one or more embodiments, a method performed by at least one processor of an encoder, comprises receiving an input mesh comprising a plurality of sub-meshes; determining, for a respective sub-mesh in the plurality of sub-meshes, a sub-mesh bounding box that encloses the respective sub-mesh; determining, for the respective sub-mesh, a coordinate in the respective sub-mesh, wherein the determined coordinate is a minimum coordinate that has a smallest value in the respective sub-mesh; determining, for the respective sub-mesh, a first bitdepth based on the determined coordinate and the determined sub-mesh bounding box, wherein the first bitdepth is an adaptive bitdepth that varies according to an area of the respective sub-mesh; determining a second bitdepth that is a maximum of the first bitdepth for the respective sub-mesh and a first bit depth determined for each of the remaining sub-meshes from the plurality of sub-meshes; quantizing the respective sub-mesh based on the second bitdepth to generate a respective quantized sub-mesh; and encoding the respective quantized sub-mesh.

According to one or more embodiments, an encoder comprises: at least one memory configured to store program code; and at least one processor configured to read the program code and operate as instructed by the program code, the program code comprising receiving code configured to cause the at least one processor to receive an input mesh comprising a plurality of sub-meshes, first determining code configured to cause the at least one processor to determine, for a respective sub-mesh from the plurality of sub-meshes, a sub-mesh bounding box that encloses the respective sub-mesh, second determining code configured to cause the at least one processor to determine, for the respective sub-mesh, a coordinate in the respective sub-mesh, wherein the determined coordinate is a minimum coordinate that has a smallest value in the respective sub-mesh, third determining code configured to cause the at least one processor to determine a first bitdepth based on the determined coordinate and the determined sub-mesh bounding box, wherein the first bitdepth is an adaptive bitdepth that varies according to an area of the respective sub-mesh, fourth determining code configured to cause the at least one processor to determine a second bitdepth that is a maximum of the first bitdepth for the respective sub-mesh and a first bit depth determined for each of the remaining sub-meshes from the plurality of sub-meshes, first quantizing code configured to cause the at least one processor to quantize the respective sub-mesh based on the second bitdepth, and encoding code configured to cause the at least one processor to encode the respective quantized sub-mesh.

According to one or more embodiments, anon-transitory computer readable medium having instructions stored therein, which when executed method performed by at least one processor of an encoder cause the encoder to execute a method comprising: receiving an input mesh comprising a plurality of sub-meshes; determining, for a respective sub-mesh from the plurality of sub-meshes, a sub-mesh bounding box that encloses the respective sub-mesh; determining, for the respective sub-mesh, a coordinate in the respective sub-mesh, wherein the determined coordinate is a minimum coordinate that has a smallest value in the respective sub-mesh; determining, for each sub-mesh, a first bitdepth based on the determined coordinate and the determined sub-mesh bounding box, wherein the first bitdepth is an adaptive bitdepth that varies according to an area of the respective sub-mesh; determining a second bitdepth that is a maximum of the first bitdepth for the respective sub-mesh and a first bit depth determined for each of the remaining sub-meshes from the plurality of sub-meshes; quantizing the respective sub-mesh based on the second bitdepth; and encoding the respective quantized sub-mesh.

BRIEF DESCRIPTION OF THE DRAWINGS

Further features, the nature, and various advantages of the disclosed subject matter will be more apparent from the following detailed description and the accompanying drawings in which:

FIG. 6 is a flowchart of an example process of quantizing multiple sub-meshes, in accordance with embodiments of the present disclosure.

DETAILED DESCRIPTION

Figure 1:
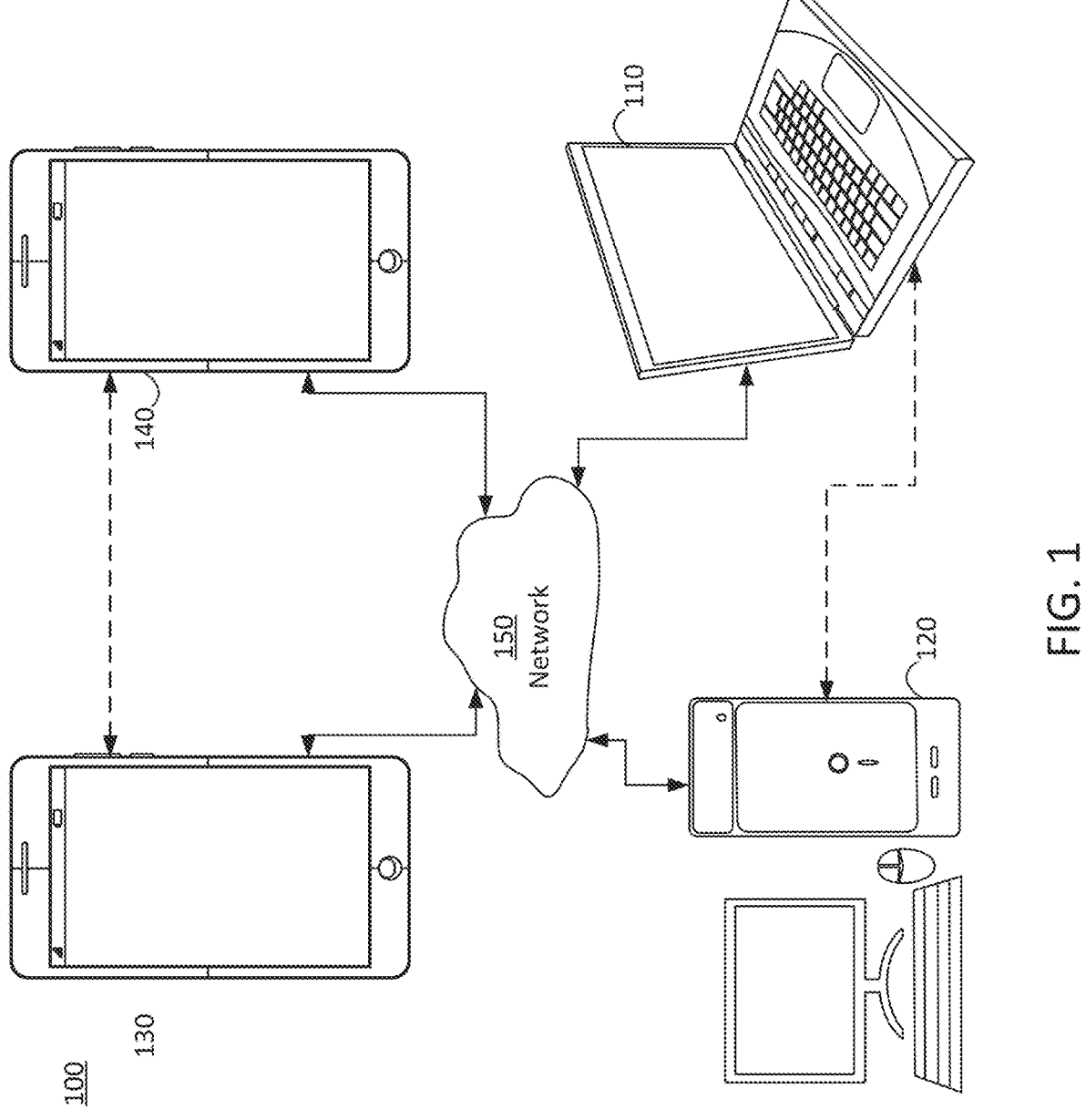
FIG. 1 is a schematic illustration of a block diagram of a communication system, in accordance with embodiments of the present disclosure.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code-it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure may be practiced without one or more of the specific features or advantages of a particular embodiment. In other instances, additional features and advantages may be recognized in certain embodiments that may not be present in all embodiments of the present disclosure.

Figure 2:
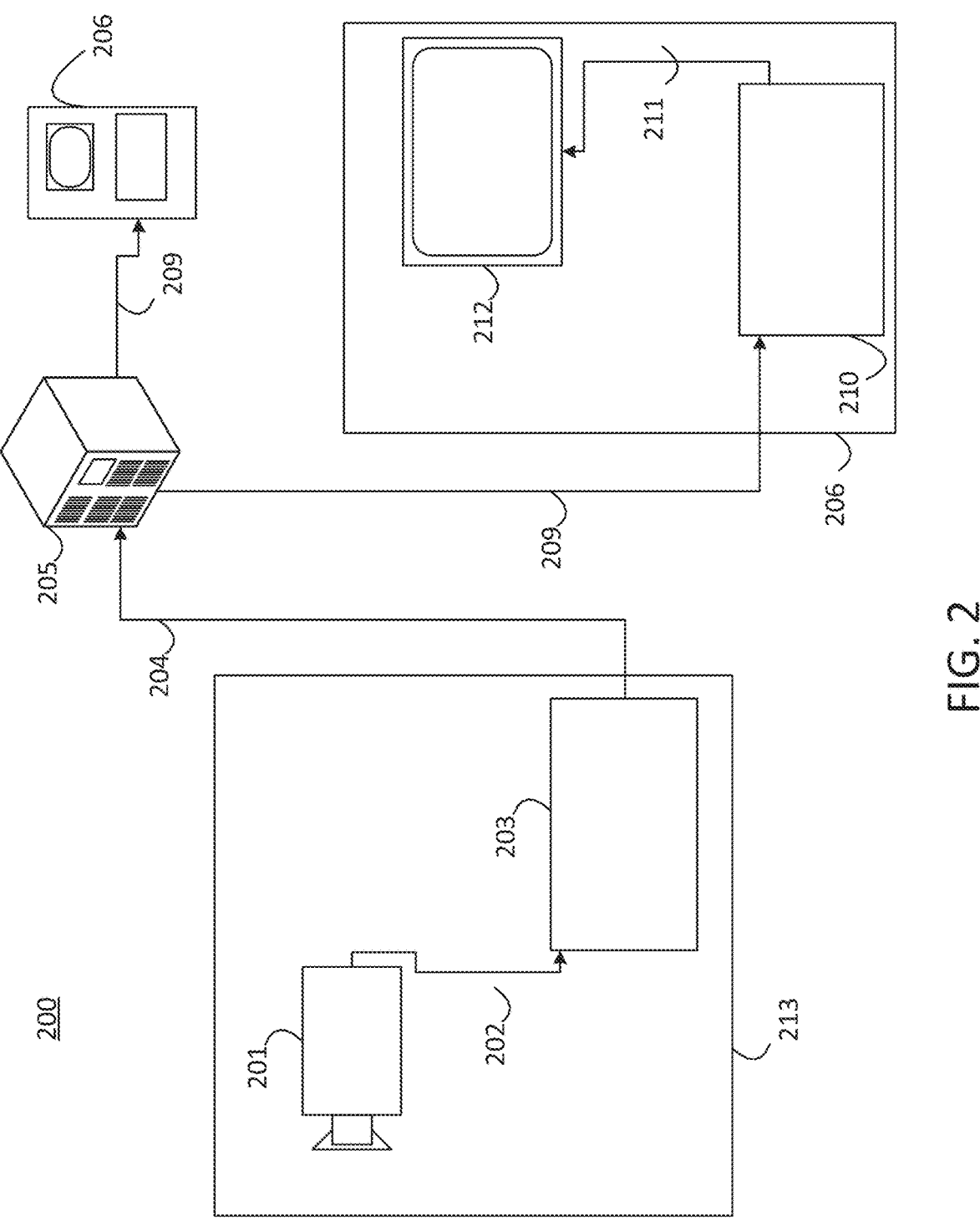
FIG. 2 is a schematic illustration of a block diagram of a streaming system, in accordance with embodiments of the present disclosure.

With reference to FIGS. 1-2, one or more embodiments of the present disclosure for implementing encoding and decoding structures of the present disclosure are described.

FIG. 1 illustrates a simplified block diagram of a communication system 100 according to an embodiment of the present disclosure. The system 100 may include at least two terminals 110, 120 interconnected via a network 150. For unidirectional transmission of data, a first terminal 110 may code video data, which may include mesh data, at a local location for transmission to the other terminal 120 via the network 150. The second terminal 120 may receive the coded video data of the other terminal from the network 150, decode the coded data and display the recovered video data. Unidirectional data transmission may be common in media serving applications and the like.

FIG. 1 illustrates a second pair of terminals 130, 140 provided to support bidirectional transmission of coded video that may occur, for example, during videoconferencing. For bidirectional transmission of data, each terminal 130, 140 may code video data captured at a local location for transmission to the other terminal via the network 150. Each terminal 130, 140 also may receive the coded video data transmitted by the other terminal, may decode the coded data and may display the recovered video data at a local display device.

In FIG. 1, the terminals 110-140 may be, for example, servers, personal computers, and smart phones, and/or any other type of terminals. For example, the terminals (110-140) may be laptop computers, tablet computers, media players and/or dedicated video conferencing equipment. The network 150 represents any number of networks that convey coded video data among the terminals 110-140 including, for example, wireline and/or wireless communication networks. The communication network 150 may exchange data in circuit-switched and/or packet-switched channels. Representative networks include telecommunications networks, local area networks, wide area networks, and/or the Internet. For the purposes of the present discussion, the architecture and topology of the network 150 may be immaterial to the operation of the present disclosure unless explained herein below.

FIG. 2 illustrates, as an example of an application for the disclosed subject matter, a placement of a video encoder and decoder in a streaming environment. The disclosed subject matter may be used with other video enabled applications, including, for example, video conferencing, digital TV, storing of compressed video on digital media including CD, DVD, memory stick and the like, and so on.

As illustrated in FIG. 2, a streaming system 200 may include a capture subsystem 213 that includes a video source 201 and an encoder 203. The streaming system 200 may further include at least one streaming server 205 and/or at least one streaming client 206.

The video source 201 may create, for example, a stream 202 that includes a 3D mesh and metadata associated with the 3D mesh. The video source 201 may include, for example, 3D sensors (e.g. depth sensors) or 3D imaging technology (e.g. digital camera(s)), and a computing device that is configured to generate the 3D mesh using the data received from the 3D sensors or the 3D imaging technology. The sample stream 202, which may have a high data volume when compared to encoded video bitstreams, may be processed by the encoder 203 coupled to the video source 201. The encoder 203 may include hardware, software, or a combination thereof to enable or implement aspects of the disclosed subject matter as described in more detail below. The encoder 203 may also generate an encoded video bitstream 204. The encoded video bitstream 204, which may have e a lower data volume when compared to the uncompressed stream 202, may be stored on a streaming server 205 for future use. One or more streaming clients 206 may access the streaming server 205 to retrieve video bit streams 209 that may be copies of the encoded video bitstream 204.

The streaming clients 206 may include a video decoder 210 and a display 212. The video decoder 210 may, for example, decode video bitstream 209, which is an incoming copy of the encoded video bitstream 204, and create an outgoing video sample stream 211 that may be rendered on the display 212 or another rendering device (not depicted). In some streaming systems, the video bitstreams 204, 209 may be encoded according to certain video coding/compression standards.

Figure 3:
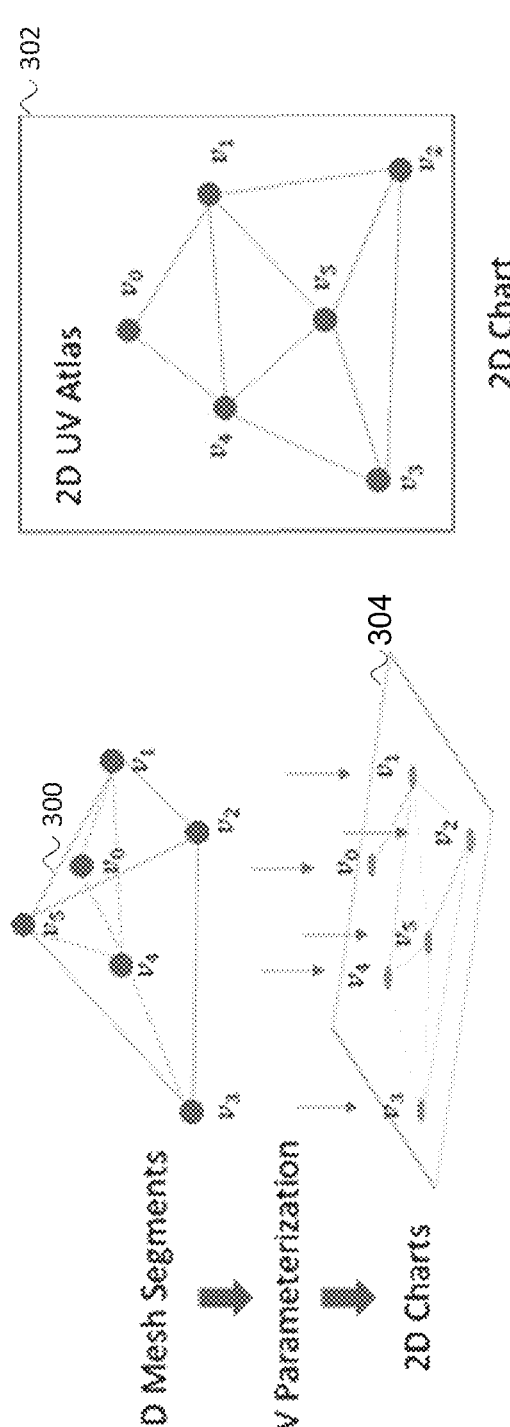
FIG. 3 illustrates an example of UV parameterization mapping from 3D mesh segments onto 2D charts, in accordance with embodiments of the present disclosure.

According to one or more embodiments, a 3D mesh may be partitioned into several segments (or patches/charts). Each segment may be composed of a set of connected vertices associated with their geometry, attribute, and connectivity information. As illustrated in FIG. 3, a UV parameterization process maps a mesh segment 300 onto a 2D chart in the 2D UV atlas (302, 304). Each vertex in the mesh segment may be assigned with a 2D UV coordinates in the 2D UV atlas. The vertices in a 2D chart may form a connected component as their 3D counterpart. The geometry and connectivity information of each vertex may be inherited from their 3D counterpart as well. Therefore, the UV coordinates map vertices in a 2D space to the 3D space based on associated UV attributes that include geometry and connectivity information.

A mesh may be a collection of vertices, edges, and faces that define a shape or an object. A 3D mesh may include a plurality of vertices, with each vertex associated with a 3D coordinate in a 3D space (e.g., x, y, z). A 2D mesh may include a plurality of vertices with each vertex associated a 2D coordinate in a 2D space (e.g., x and y). The vertices may be connected to form edges, where a collection of vertices may define a face. A sub-mesh may be a part or portion of a mesh.

The embodiments of the present disclosure are directed to quantizing multiple sub-meshes. The embodiments of the present disclosure may be used separately or combined in any order and may be used for arbitrary polygon meshes. In one or more examples, a mesh is assumed to be fully or partially symmetric in geometry. While the embodiments of the present disclosure utilize vertices as an example, the embodiments of the present disclosure may also be applied to other attributes such as a texture coordinate and a normal.

Figures 4A, 4B:
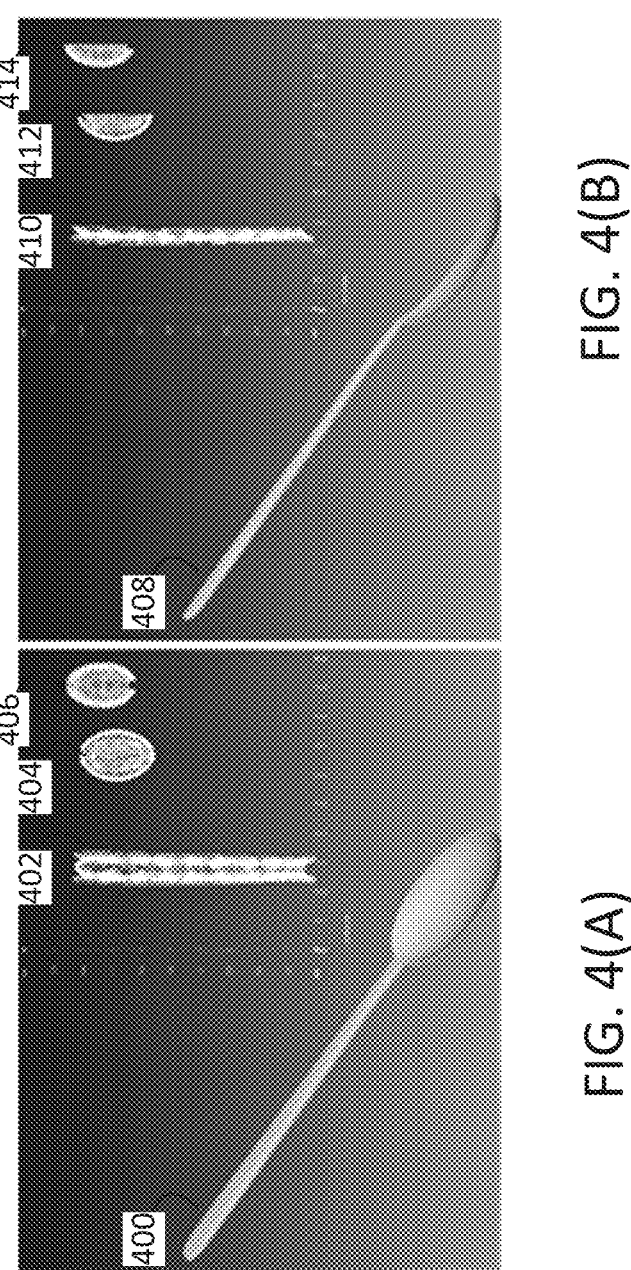
FIG. 4(A) is an illustration of a mesh and a corresponding UV attribute map, in accordance with embodiments of the present disclosure.
FIG. 4(B) is an illustration of a half symmetry mesh and a corresponding UV attribute map, in accordance with embodiments of the present disclosure.

According to one or more embodiments, segmentation is performed on an input mesh. The input mesh may be segmented into multiple non-connected parts in the UV attribute map. For example, FIG. 4(A) shows a UV map of a spoon mesh 400 that is segmented into three non-connected parts (402, 404, 406). FIG. 4(B) shows a UV map of the half spoon mesh 408 that is segmented into three non-connected parts (410, 412, 414).

As illustrated in FIGS. 4(A) and 4(B), a symmetry coding method may extract half of a symmetry UV mesh and leave empty spaces. In the context of symmetry-based coding, the remaining parts (e.g., FIG. 4(B)) are coded and later used as a reference to predict the other half of the UV information.

In one or more examples, before encoding, all attributes of a mesh (e.g., vertex, texture coordinate, normal) may be quantized at different bitdepths using uniform quantization. Referring to vertex compression as one example, a mesh M with m points in an (x, y, z) coordinate space may be quantized by a QP bitdepth. The quantization step size for all three dimensions (x, y, z) may be determined based on a largest length of a bounding box in all dimensions (e.g., $d_{bbox} > 0$). The same quantization step size may be applied for all objects in a mesh as follows.

$$\Delta_{qp} = \frac{d_{bbox}}{2^{QP} - 1},$$ 
<div align="right">Eq. (1)</div>

In one or more examples, a scalar quantization is applied for the j-th point at i-th coordinate as follows.

$$\tilde{a}_{ij} = \left\lfloor \frac{a_{ij} - \theta_i}{\Delta_{qp}} + \theta_{QP} \right\rfloor, i \in \{x, y, z\}, j \in [1, \ldots, m],$$ 
<div align="right">Eq. (2)</div> where $\theta_{op} = 0.5$ is an offset parameter for quantization. $\theta_i$ may be a minimum coordinate of a mesh $\mathcal{M}$ at an i-th dimension.

The notation $[\cdot]$ represents a floor rounding operator. The dequantized coordinate is calculated with uniform dequantization as follows.

$$\hat{a}_{i,j} = \tilde{a}_{i,j} * \Delta_{qp} + \theta_i, i \in \{x, y, z\}, j \in [1, \ldots, m],$$ 
<div align="right">Eq. (3)</div> with the mean square error of quantization as:

$$\epsilon_{QP} = \frac{1}{n} \sum_i^{\{x,y,z\}} \sum_j^m (a_{ij} - \hat{a}_{ij})^2.$$ 
<div align="right">Eq. (4)</div>

Figure 5:
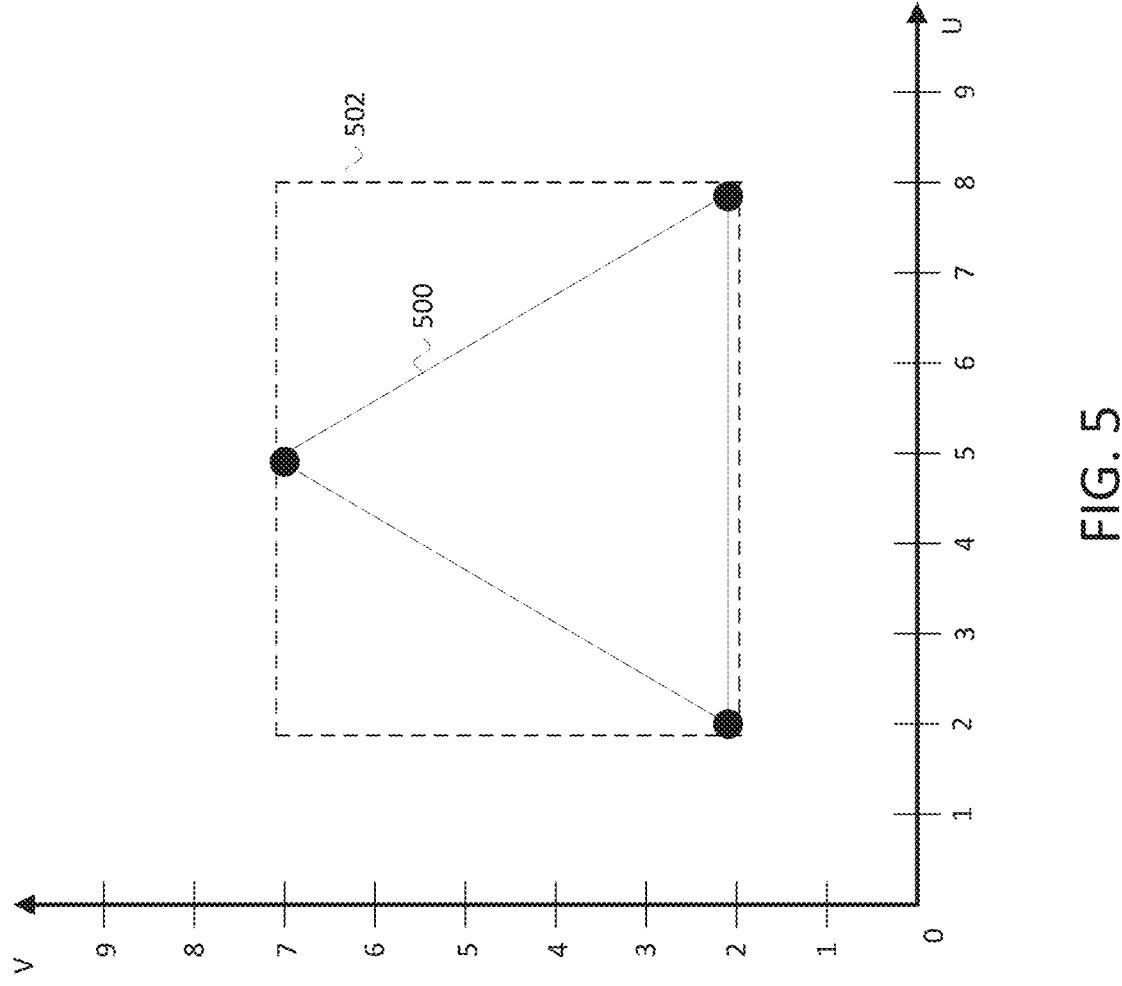
FIG. 5 is a schematic illustration of an example mesh with a corresponding bounding box, in accordance with embodiments of the present disclosure.

FIG. 5 illustrates an example mesh 500 that is enclosed by a bounding box 502. As illustrated in FIG. 5, the bounding box 502 includes a $u_{min}=2$, $u_{max}=8$, $v_{min}=2$, and $v_{max}=7$. The parameters $u_{min}$, $u_{max}$, $v_{min}$, and $v_{max}$ may be the parameters of a bounding box utilized to compute a quantization step size. For example, in Eq. (1), $d_{bbox}$ may be determined as max $(u_{max}-u_{min}, v_{max}-v_{min})$. In a 3D space, each coordinate may include a z coordinate, where the bounding box further includes $z_{min}$ and $z_{max}$, where $d_{bbox}$ may be determined as max $(u_{max}-u_{min}, v_{max}-v_{min}, z_{max}-z_{min})$.

According to one or more embodiments, each sub-mesh is quantized independently with a different bounding box and quantization bitdepth. For example, each sub-mesh $\mathcal{M}_k$ has a corresponding minimum coordinate $$\theta^k = \{\theta_i^k\},$$

and a quantization bithdepth $QP^k$.

According to one or more embodiments, a bounding box of an input mesh is used for all sub-meshes. For example, a minimum position $\theta_i$ may be the same for all sub-meshes. In contrast, if each sub-mesh uses a different bounding box, distortion may be caused in a transition shift for a whole sub-mesh due to a quantization error related to $\theta_i$.

According to one or more embodiments, an adaptive bitdepth is assigned based on the area of each sub-mesh. For example, $C^k$ denotes an area of sub-mesh $\mathcal{M}^k$, which may be calculated as the summation of all faces of sub-mesh $\mathcal{M}^k$. The quantization bitdepth of k-th sub-mesh may be defined as follows.

$$QP_k = \text{Clip}\left(QP * \frac{C^k}{\sum_{k=1}^{K} C^k}, QP_{min}, QP_{max}\right), \qquad \text{Eq. (5)}$$

where QP is clipped within a limited range $[QP_{min}, QP_{max}]$.

In one or more examples, the maximum and minimum range is defined based on difference in bounding box sizes of sub-meshes. For example, $QP_{min}$ may be determined based on a smallest bounding box of the sub-meshes, and $QP_{max}$ may be determined based on a largest bounding box of the sub-meshes.

According to one or more embodiments, for two connected sub-meshes, these meshes may be separated by a set of corresponding attributes (e.g., the set of vertices when the corresponding attribute is geometry). These meshes may also be separated by a plane, 3D spaces, or any other suitable separation technique known to one of ordinary skill in the art.

In one or more examples, after two connected sub-meshes are separated, new vertices may be derived and added to both sub-meshes to preserve a shape of the separated sub-meshes. For example, a new vertex $v_i$ may be derived and added to both sub-mesh $\mathcal{M}^k$ and $$\mathcal{M}^{k+1} \text{ as } v_i^k \text{ and } v_i^{k+1},$$

respectively. A different level of quantization in $\mathcal{M}^k$ and $\mathcal{M}^{k+1}$ may cause significant differences and distortion between two vertices $$\hat{v}_i^k, \hat{v}_i^{k+1}$$

after dequantization. Therefore, the embodiments of the present disclosure provides a method to derive new vertices with multiple distortion. In one or more examples, this method may be implemented in accordance with the following Steps 1-5.

Step 1. Derive minimum attributes. The derivation of minimum attributes may correspond to deriving a minimum coordinate for each sub-mesh. The minimum coordinate may be a vertex, texture coordinate, or normal. The minimum coordinate may be a coordinate having a smallest value in a sub-mesh. In one or more examples, when the minimum coordinate is a vertex in a UV plane, the minimum coordinate may be the coordinate having the smallest U or V coordinate. In one or more examples, when the minimum coordinate is a texture coordinate, the minimum coordinate may be the coordinate in the sub-mesh having a smallest texture value.

Step 2. Derive an adaptive bitdepth for a given attribute of each sub-mesh. The adaptive bit depth for each sub-mesh may be determined in accordance with Eq. (5).

Step 3. Quantize all sub-meshes with the maximum quantization bitdepth as follows:

$$QP_{max} = \max\{QP_k\} \; \forall k \in [1, K] \qquad \text{Eq. (6)}$$

Accordingly, the maximum quantization bitdepth may be determined by retrieving the maximum adaptive bitdepth derived in Step 2.

Step 4. Derive all new vertices and separate connected sub-meshes. In one or more examples, Step 4 is performed before Step 3. In one or more examples, Step 4 is performed after Step 3.

Step 5. Reduce a bitdepth of each sub-mesh by $\Delta QP_k = QP_{max} - QP_k$. In one or more examples, Steps 4 and 5 are performed only for the connected sub-meshes. After Step 5 is performed, a second quantization may be performed on the separated sub-meshes based on the reduced bitdepth. Therefore, a first quantization is performed on these sub-meshes based on the maximum quantization bitdepth determined in Step 3, and a second quantization is performed with the reduced bitdepth determined in Step 5 for each separated sub-mesh.

FIG. 6 illustrates an example process 600 of quantizing multiple sub-meshes, according to one or more embodiments of the present disclosure. The process 600 may be performed by an encoder such as encoder 203 (FIG. 2).

The process may start at operation S602 where an input mesh is divided into a plurality of sub-meshes. For example, referring to FIG. 4(A), the input mesh 400 may be divided into parts 402, 404, and 406, each of which may correspond to a different sub-mesh.

The process proceeds to operation S604 where, for each sub-mesh, a sub-mesh bounding box that encloses a respective sub-mesh may be determined. For example, referring to FIG. 5, the illustrated mesh 500 may be sub-mesh that is part of a larger mesh, where the box 502 may be a sub-mesh bounding box that bounds the sub-mesh.

The process proceeds to operation S606 where, for each sub-mesh, a minimum coordinate for each sub-mesh is determined. For example, the minimum coordinate may be a vertex, texture coordinate, or normal.

The process proceeds to operation S608 where, for each sub-mesh, an adaptive bitdepth is determined based on a respective minimum coordinate and respective sub-mesh bounding box. For example, the adaptive bitdepth may be determined in accordance with Eq. (4).

The process proceeds to operation S610 where a maximum adaptive bitdepth is determined based on each determined adaptive bitdepth. For example, the maximum adaptive bitdepth may be determined in accordance with Eq. (5).

The process proceeds to operation S612 where each sub-mesh is quantized based on the maximum adaptive bitdepth.

The process proceeds to operation S614 where each sub-mesh is quantized.

The techniques, described above, may be implemented as computer software using computer-readable instructions and physically stored in one or more computer-readable media. For example, FIG. 7 shows a computer system 700 suitable for implementing certain embodiments of the disclosure.

The computer software may be coded using any suitable machine code or computer language, that may be subject to assembly, compilation, linking, or like mechanisms to create code including instructions that may be executed directly, or through interpretation, micro-code execution, and the like, by computer central processing units (CPUs), Graphics Processing Units (GPUs), and the like.

The instructions may be executed on various types of computers or components thereof, including, for example, personal computers, tablet computers, servers, smartphones, gaming devices, internet of things devices, and the like.

Figure 7:
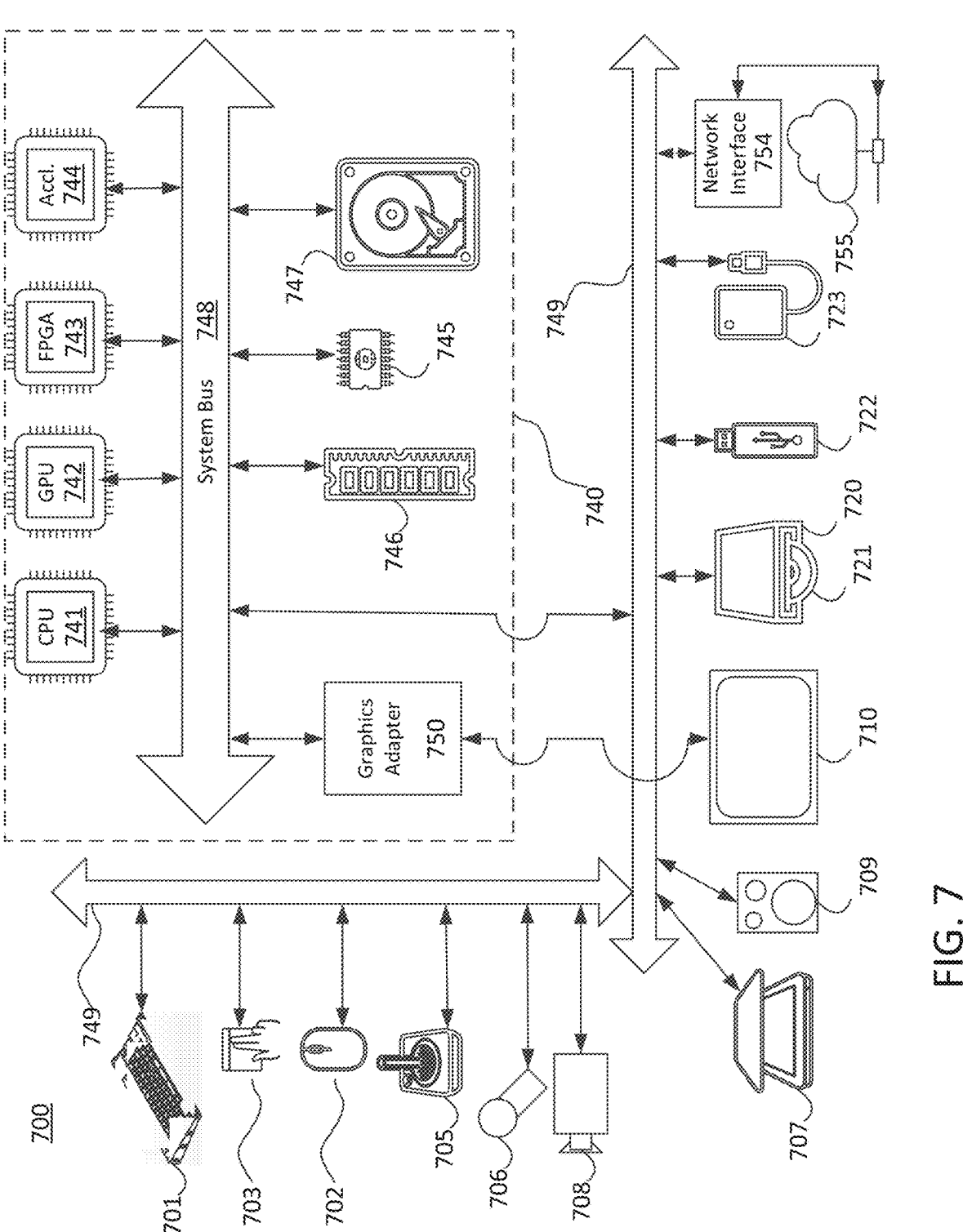
FIG. 7 is a diagram of a computer system suitable for implementing the embodiments of the present disclosure.

The components shown in FIG. 7 for computer system 700 are examples and are not intended to suggest any limitation as to the scope of use or functionality of the computer software implementing embodiments of the present disclosure. Neither should the configuration of components be interpreted as having any dependency or requirement relating to any one or combination of components illustrated in the non-limiting embodiment of a computer system 700.

Computer system 700 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices may also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 701, mouse 702, trackpad 703, touch screen 710, data-glove, joystick 705, microphone 706, scanner 707, camera 708.

Computer system 700 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 710, data glove, or joystick 705, but there may also be tactile feedback devices that do not serve as input devices). For example, such devices may be audio output devices (such as: speakers 709, headphones (not depicted)), visual output devices (such as screens 710 to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system 700 may also include human accessible storage devices and their associated media such as optical media including CD/DVD ROM/RW 720 with CD/DVD or the like media 721, thumb-drive 722, removable hard drive or solid state drive 723, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 700 may also include interface to one or more communication networks. Networks may be wireless, wireline, optical. Networks may further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses 749 (such as, for example USB ports of the computer system 700; others are commonly integrated into the core of the computer system 700 by attachment to a system bus as described below (for example Ethernet interface into a PC computer system or cellular network interface into a smartphone computer system). Using any of these networks, computer system 700 may communicate with other entities. Such communication may be uni-directional, receive only (for example, broadcast TV), uni-directional send-only (for example CANbus to certain CANbus devices), or bi-directional, for example to other computer systems using local or wide area digital networks. Such communication may include communication to a cloud computing environment 755. Certain protocols and protocol stacks may be used on each of those networks and network interfaces as described above.

Aforementioned human interface devices, human-accessible storage devices, and network interfaces 754 may be attached to a core 740 of the computer system 700.

The core 740 may include one or more Central Processing Units (CPU) 741, Graphics Processing Units (GPU) 742, specialized programmable processing units in the form of Field Programmable Gate Areas (FPGA) 743, hardware accelerators for certain tasks 744, and so forth. These devices, along with Read-only memory (ROM) 745, Random-access memory 746, internal mass storage such as internal non-user accessible hard drives, SSDs, and the like 747, may be connected through a system bus 748. In some computer systems, the system bus 748 may be accessible in the form of one or more physical plugs to enable extensions by additional CPUs, GPU, and the like. The peripheral devices may be attached either directly to the core's system bus 748, or through a peripheral bus 749. Architectures for a peripheral bus include PCI, USB, and the like. A graphics adapter 750 may be included in the core 740.

CPUs 741, GPUs 742, FPGAs 743, and accelerators 744 may execute certain instructions that, in combination, may make up the aforementioned computer code. That computer code may be stored in ROM 745 or RAM 746. Transitional data may be also stored in RAM 746, whereas permanent data may be stored for example, in the internal mass storage 747. Fast storage and retrieve to any of the memory devices may be enabled through the use of cache memory, that may be closely associated with one or more CPU 741, GPU 742, mass storage 747, ROM 745, RAM 746, and the like.

The computer readable media may have computer code thereon for performing various computer-implemented operations. The media and computer code may be those specially designed and constructed for the purposes of the present disclosure, or they may be of the kind well known and available to those having skill in the computer software arts.

As an example and not by way of limitation, the computer system having architecture 700, and specifically the core 740 may provide functionality as a result of processor(s) (including CPUs, GPUs, FPGA, accelerators, and the like) executing software embodied in one or more tangible, computer-readable media. Such computer-readable media may be media associated with user-accessible mass storage as introduced above, as well as certain storage of the core 740 that are of non-transitory nature, such as core-internal mass storage 747 or ROM 745. The software implementing various embodiments of the present disclosure may be stored in such devices and executed by core 740. A computer-readable medium may include one or more memory devices or chips, according to particular needs. The software may cause the core 740 and specifically the processors therein (including CPU, GPU, FPGA, and the like) to execute particular processes or particular parts of particular processes described herein, including defining data structures stored in RAM 746 and modifying such data structures according to the processes defined by the software. In addition or as an alternative, the computer system may provide functionality as a result of logic hardwired or otherwise embodied in a circuit (for example: accelerator 744), which may operate in place of or together with software to execute particular processes or particular parts of particular processes described herein. Reference to software may encompass logic, and vice versa, where appropriate. Reference to a computer-readable media may encompass a circuit (such as an integrated circuit (IC)) storing software for execution, a circuit embodying logic for execution, or both, where appropriate. The present disclosure encompasses any suitable combination of hardware and software.

While this disclosure has described several non-limiting embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The above disclosure also encompasses the embodiments listed below:

(1) A method performed by at least one processor of an encoder, comprising: receiving an input mesh comprising a plurality of sub-meshes; determining, for a respective sub-mesh in the plurality of sub-meshes, a sub-mesh bounding box that encloses the respective sub-mesh; determining, for the respective sub-mesh, a coordinate in the respective sub-mesh, in which the determined coordinate is a minimum coordinate that has a smallest value in the respective sub-mesh; determining, for the respective sub-mesh, a first bitdepth based on the determined coordinate and the determined sub-mesh bounding box, in which the first bitdepth is an adaptive bitdepth that varies according to an area of the respective sub-mesh; determining a second bitdepth that is a maximum of the first bitdepth for the respective sub-mesh and a first bit depth determined for each of the remaining sub-meshes from the plurality of sub-meshes; quantizing the respective sub-mesh based on the second bitdepth to generate a respective quantized sub-mesh; and encoding the respective quantized sub-mesh.

(2) The method according to feature (1), in which the first bitdepth for the respective sub-mesh is determined based on a summation of each face of the respective sub-mesh.

(3) The method according to feature (1) or (2), in which the first bitdepth of the respective sub-mesh is limited to a bitdepth range comprising a predetermined minimum bitdepth and a predetermined maximum bitdepth.

(4) The method according to feature (3), in which the bitdepth range is determined based on a difference in size of the sub-mesh bounding box determined for the respective sub-mesh and a sub-mesh bounding box determined for each remaining sub-mesh from the plurality of sub-meshes.

(5) The method according to any one feature (1)-(4), in which the plurality of sub-meshes include a first sub-mesh that is connected to a second sub-mesh, and in which the method further comprises separating the first sub-mesh from the second sub-mesh, and adding at least one vertex that is included in both the first sub-mesh and the second sub-mesh.

(6) The method according to feature (5), reducing a first bitdepth of the first sub-mesh based a difference between the second bitdepth and the first bitdepth of the first sub-mesh, the first bitdepth of the first sub-mesh determined according to an area of the first sub-mesh; and performing quantization on the first sub-mesh based on the reduced first bitdepth.

(7) The method according to feature (6), reducing a third bitdepth of the second sub-mesh based on a difference between the second bitdepth and the third bitdepth, the third bitdepth of the second sub-mesh determined according to an area of the second sub-mesh; and performing quantization on the second sub-mesh based on the reduced third bitdepth.

(8) The method according to any one of features (1)-(7), in which the coordinate is a vertex coordinate.

(9) The method according to any one of features (1)-(7), in which the coordinate is a texture coordinate.

(10) An encoder comprising: at least one memory configured to store program code; and at least one processor configured to read the program code and operate as instructed by the program code, the program code comprising: receiving code configured to cause the at least one processor to receive an input mesh comprising a plurality of sub-meshes, first determining code configured to cause the at least one processor to determine, for a respective sub-mesh from the plurality of sub-meshes, a sub-mesh bounding box that encloses the respective sub-mesh, second determining code configured to cause the at least one processor to determine, for the respective sub-mesh, a coordinate in the respective sub-mesh, in which the determined coordinate is a minimum coordinate that has a smallest value in the respective sub-mesh, third determining code configured to cause the at least one processor to determine a first bitdepth based on the determined coordinate and the determined sub-mesh bounding box, in which the first bitdepth is an adaptive bitdepth that varies according to an area of the respective sub-mesh, fourth determining code configured to cause the at least one processor to determine a second bitdepth that is a maximum of the first bitdepth for the respective sub-mesh and a first bit depth determined for each of the remaining sub-meshes from the plurality of sub-meshes, first quantizing code configured to cause the at least one processor to quantize the respective sub-mesh based on the second bitdepth, and encoding code configured to cause the at least one processor to encode the respective quantized sub-mesh.

(11) The encoder according to feature (10), in which the first bitdepth for the respective sub-mesh is determined based on a summation of each face of the respective.

(12) The encoder according to feature (10) or (11), in which the first bitdepth of the respective sub-mesh is limited to a bitdepth range comprising a predetermined minimum bitdepth and a predetermined maximum bitdepth.

(13) The encoder according to feature (12), in which the bitdepth range is determined based on a difference in size of the sub-mesh bounding box determined for the respective sub-mesh and a sub-mesh bounding box determined for each remaining sub-mesh from the plurality of sub-meshes.

(14) The encoder according to any one of features (10)-(13), in which the plurality of sub-meshes include a first sub-mesh that is connected to a second sub-mesh, and in which the program code further includes: separating code configured to cause the at least one processor to separate the first sub-mesh from the second sub-mesh, and first adding code configured to cause the at least one processor to add at least one vertex that is included in both the first sub-mesh and the second sub-mesh.

(15) The encoder according to feature (14), in which the program code further includes: first reducing code configured to cause the at least one processor to reduce a first bitdepth of the first sub-mesh based a difference between the second bitdepth and the first bitdepth of the first sub-mesh, the first bitdepth of the first sub-mesh determined according to an area of the first sub-mesh, and second quantizing code configured to cause the at least one processor to configured to perform quantization on the first sub-mesh based on the reduced first bitdepth.

(16) The encoder according to feature (15), in which the program code further includes: second reducing code configured to cause the at least one processor to reduce a third bitdepth of the second sub-mesh based on a difference between the second bitdepth and the third bitdepth, the third bitdepth of the second sub-mesh determined according to an area of the second sub-mesh, and third quantizing code configured to cause the at least one processor to perform quantization on the second sub-mesh based on the reduced third bitdepth.

(17) The encoder according to any one of features (10)-(16), in which the coordinate is a vertex coordinate.

(18) The encoder according to any one of features (10)-(16), in which the coordinate is a texture coordinate.

(19) A non-transitory computer readable medium having instructions stored therein, which when executed method performed by at least one processor of an encoder cause the encoder to execute a method comprising: receiving an input mesh comprising a plurality of sub-meshes; determining, for a respective sub-mesh from the plurality of sub-meshes, a sub-mesh bounding box that encloses the respective sub-mesh; determining, for the respective sub-mesh, a coordinate in the respective sub-mesh, in which the determined coordinate is a minimum coordinate that has a smallest value in the respective sub-mesh; determining, for each sub-mesh, a first bitdepth based on the determined coordinate and the determined sub-mesh bounding box, in which the first bitdepth is an adaptive bitdepth that varies according to an area of the respective sub-mesh; determining a second bitdepth that is a maximum of the first bitdepth for the respective sub-mesh and a first bit depth determined for each of the remaining sub-meshes from the plurality of sub-meshes; quantizing the respective sub-mesh based on the second bitdepth; and encoding the respective quantized sub-mesh.

(20) The non-transitory computer readable medium according to feature (19), in which the first bitdepth for each sub-mesh is determined based on an area of a respective sub-mesh.

What is claimed is:

1. A method performed by at least one processor of an encoder, comprising:

receiving an input mesh comprising a plurality of sub-meshes;

determining, for a respective sub-mesh in the plurality of sub-meshes, a sub-mesh bounding box that encloses the respective sub-mesh;

determining, for the respective sub-mesh, a coordinate in the respective sub-mesh, wherein the determined coordinate is a minimum coordinate that has a smallest value in the respective sub-mesh;

determining, for the respective sub-mesh, a first bitdepth based on the determined coordinate and the determined sub-mesh bounding box, wherein the first bitdepth is an adaptive bitdepth that varies according to an area of the respective sub-mesh;

determining a second bitdepth that is a maximum of the first bitdepth for the respective sub-mesh and a first bit depth determined for each of the remaining sub-meshes from the plurality of sub-meshes;

quantizing the respective sub-mesh based on the second bitdepth to generate a respective quantized sub-mesh; and encoding the respective quantized sub-mesh.

2. The method according to claim 1, wherein the first bitdepth for the respective sub-mesh is determined based on a summation of each face of the respective sub-mesh.

3. The method according to claim 1, wherein the first bitdepth of the respective sub-mesh is limited to a bitdepth range comprising a predetermined minimum bitdepth and a predetermined maximum bitdepth.

4. The method according to claim 3, wherein the bitdepth range is determined based on a difference in size of the sub-mesh bounding box determined for the respective sub-mesh and a sub-mesh bounding box determined for each remaining sub-mesh from the plurality of sub-meshes.

5. The method according to claim 1, wherein the plurality of sub-meshes include a first sub-mesh that is connected to a second sub-mesh, and wherein the method further comprises:

separating the first sub-mesh from the second sub-mesh, and adding at least one vertex that is included in both the first sub-mesh and the second sub-mesh.

6. The method according to claim 5, reducing a first bitdepth of the first sub-mesh based a difference between the second bitdepth and the first bitdepth of the first sub-mesh, the first bitdepth of the first sub-mesh determined according to an area of the first sub-mesh; and performing quantization on the first sub-mesh based on the reduced first bitdepth.

7. The method according to claim 6, reducing a third bitdepth of the second sub-mesh based on a difference between the second bitdepth and the third bitdepth, the third bitdepth of the second sub-mesh determined according to an area of the second sub-mesh; and performing quantization on the second sub-mesh based on the reduced third bitdepth.

8. The method according to claim 1, wherein the coordinate is a vertex coordinate.

9. The method according to claim 1, wherein the coordinate is a texture coordinate.

10. An encoder comprising:

at least one memory configured to store program code; and at least one processor configured to read the program code and operate as instructed by the program code, the program code comprising:

receiving code configured to cause the at least one processor to receive an input mesh comprising a plurality of sub-meshes, first determining code configured to cause the at least one processor to determine, for a respective sub-mesh from the plurality of sub-meshes, a sub-mesh bounding box that encloses the respective sub-mesh, second determining code configured to cause the at least one processor to determine, for the respective sub-mesh, a coordinate in the respective sub-mesh, wherein the determined coordinate is a minimum coordinate that has a smallest value in the respective sub-mesh, third determining code configured to cause the at least one processor to determine a first bitdepth based on the determined coordinate and the determined sub-mesh bounding box, wherein the first bitdepth is an adaptive bitdepth that varies according to an area of the respective sub-mesh, fourth determining code configured to cause the at least one processor to determine a second bitdepth that is a maximum of the first bitdepth for the respective sub-mesh and a first bit depth determined for each of the remaining sub-meshes from the plurality of sub-meshes, first quantizing code configured to cause the at least one processor to quantize the respective sub-mesh based on the second bitdepth, and encoding code configured to cause the at least one processor to encode the respective quantized sub-mesh.

11. The encoder according to claim 10, wherein the first bitdepth for the respective sub-mesh is determined based on a summation of each face of the respective.

12. The encoder according to claim 10, wherein the first bitdepth of the respective sub-mesh is limited to a bitdepth range comprising a predetermined minimum bitdepth and a predetermined maximum bitdepth.

13. The encoder according to claim 12, wherein the bitdepth range is determined based on a difference in size of the sub-mesh bounding box determined for the respective sub-mesh and a sub-mesh bounding box determined for each remaining sub-mesh from the plurality of sub-meshes.

14. The encoder according to claim 10, wherein the plurality of sub-meshes include a first sub-mesh that is connected to a second sub-mesh, and wherein the program code further includes:

separating code configured to cause the at least one processor to separate the first sub-mesh from the second sub-mesh, and first adding code configured to cause the at least one processor to add at least one vertex that is included in both the first sub-mesh and the second sub-mesh.

15. The encoder according to claim 14, wherein the program code further includes:

first reducing code configured to cause the at least one processor to reduce a first bitdepth of the first sub-mesh based a difference between the second bitdepth and the first bitdepth of the first sub-mesh, the first bitdepth of the first sub-mesh determined according to an area of the first sub-mesh, and second quantizing code configured to cause the at least one processor to configured to perform quantization on the first sub-mesh based on the reduced first bitdepth.

16. The encoder according to claim 15, wherein the program code further includes:

second reducing code configured to cause the at least one processor to reduce a third bitdepth of the second sub-mesh based on a difference between the second bitdepth and the third bitdepth, the third bitdepth of the second sub-mesh determined according to an area of the second sub-mesh, and third quantizing code configured to cause the at least one processor to perform quantization on the second sub-mesh based on the reduced third bitdepth.

17. The encoder according to claim 10, wherein the coordinate is a vertex coordinate.

18. The encoder according to claim 10, wherein the coordinate is a texture coordinate.

19. A non-transitory computer readable medium having instructions stored therein, which when executed method performed by at least one processor of an encoder cause the encoder to execute a method comprising:

receiving an input mesh comprising a plurality of sub-meshes;

determining, for a respective sub-mesh from the plurality of sub-meshes, a sub-mesh bounding box that encloses the respective sub-mesh;

determining, for the respective sub-mesh, a coordinate in the respective sub-mesh, wherein the determined coordinate is a minimum coordinate that has a smallest value in the respective sub-mesh;

determining, for each sub-mesh, a first bitdepth based on the determined coordinate and the determined sub-mesh bounding box, wherein the first bitdepth is an adaptive bitdepth that varies according to an area of the respective sub-mesh;

determining a second bitdepth that is a maximum of the first bitdepth for the respective sub-mesh and a first bit depth determined for each of the remaining sub-meshes from the plurality of sub-meshes;

quantizing the respective sub-mesh based on the second bitdepth; and encoding the respective quantized sub-mesh.

20. The non-transitory computer readable medium according to claim 19, wherein the first bitdepth for each sub-mesh is determined based on an area of a respective sub-mesh.

* * * * *